United States Patent Office 3,733,203
Patented May 15, 1973

---

3,733,203
AMMONIATED PHOSPHORIC ACID, MOLASSES, SULFATE FEED SUPPLEMENT FOR RUMINANTS
Donald M. Steen, Morrill, Nebr., assignor to Allied Chemical Corporation, Morris Township, N.J.
No Drawing. Continuation-in-part of application Ser. No. 484,460, Sept. 1, 1965. This application Mar. 5, 1970, Ser. No. 16,988
Int. Cl. A23k 1/22; C05f 5/00; C05c 9/00
U.S. Cl. 99—2 ND
2 Claims

ABSTRACT OF THE DISCLOSURE

A feed supplement for ruminant animals comprising a supply of non-protein nitrogen, such as urea, a water-soluble sulfate and ammoniated phosphoric acid, providing a sulfur-nitrogen ratio of not more than 15 parts of nitrogen to 1 part of sulfur by weight. Pyrophosphate included in the feed acts as a sequestering agent upon the trace minerals therein. The feed may also contain vitamins, antibiotics, hormones and/or salt as desired. The described feed supplement provides a desired nutrition for animals, increasing their growth rate, health and digestive efficiency.

---

This application is a continuation-in-part of copending application Ser. No. 484,460, filed on Sept. 1, 1965, now abandoned.

This invention relates to an improved feed for animals, more particularly an improved feed supplement utilized in the fattening ration for cattle and sheep, commonly known as ruminant animals.

It is recognized that there are many free-choice feed supplements for ruminant animals in existence which contain nutrients and a liquid carrier such as water and molasses.

Generally, liquid supplements are fed on a free-choice feeding program, where the present feed supplement provides a source of nutrition on a controlled basis to the animal to enable the use of drugs and chemicals, which otherwise might have harmful effects upon the animals if not controlled. Control of the feed is accomplished by mechanically metering or weighing each day the supplement to be fed to the livestock. Consequently, it is a primary object of this invention to provide a supplement feed in liquid form which can be controlled and which can provide a highly concentrated source of nutrients, drugs and chemicals necessary to increase the growth rate, health and digestive efficiency of livestock.

A further object of this invention is to provide a feed supplement containing diethylstilbestrol, a hormone, which will be held in suspension in the supplement, thereby resulting in equal distribution throughout the supplement, rather than concentrating in a portion of the supplement as a result of settling, which would be dangerous to the animal when fed that portion of the supplement containing the concentrated hormones.

A further object of this invention is to provide a feed supplement which contains a phosphorus source as an added mineral.

A still further object of this invention is to provide a feed supplement which is non-corrosive, thus eliminating special handling. Yet another object of this invention is to provide a feed supplement which utilizes pyrophosphate, an inexpensive form of phosphate, which will produce a sequestering effect upon the desirable trace minerals which are desired to be added to the supplement. The pyrophosphate may be added directly to the feed or may be inherently contained in the ammoniated phosphoric acid added thereto.

A further object of this invention is to provide a feed supplement containing ammoniated phosphoric acid, which may contain pyrophosphate as mentioned above, to eliminate foaming and jelling of the supplement when added to a material, such as molasses. The ammoniated phosphoric acid also serves as an inexpensive supply of non-protein nitrogen to be utilized by the animal, which when combined with urea, increases the growth rate of microflora in the rumen of the animal.

A further and resulting object of this invention is to provide a feed supplement in liquid form for convenient use for adding to the fattening ration of animals to produce the maximum gain per animal for less expense than existing feeds and feeding programs. Tests of the product herein set forth have proved that this is the case.

These and other objects and advantages of the present invention will become apparent to those skilled in the art from a consideration of the following specification and claims.

To obtain the desired objects of the invention, it is necessary to consider the ingredients utilized and the proportion of each ingredient to the feed supplement as a whole, which supplement is then added to the basic feed or roughage, producing the total ration for the animal. The following details set forth the preferred form of the invention, but are not considered strictly limiting, it being recognized that equivalents of the ingredients may be used and that minor variations in the proportions may be made without departing from the true spirit of the invention.

The following steps are carried out in producing the preferred form of the invention, considering the resultant product to be the total liquid bulk weight of 2,000 pounds.

STEP I

In a separate container, mix 370 pounds of water with 245 pounds of urea and 100 pounds of a water-soluble sulfate such as sodium sulfate or sulfate of ammonia.

STEP II

In a separate mixing container, mix one pound of a hormone, such as diethylstilbestrol, with two pounds of an emulsifier such as Atlas powder. Agitate and add equal parts (3 pounds) of water while agitating.

STEP III

Mix thoroughly the products of Step I and Step II.

STEP IV

Add 1,000 pounds of molasses or other liquid carrier and 100 pounds of salt. Mix thoroughly with the product of Step III.

STEP V

Mix in a separate container, 3.5 pounds of "40" gram per pound of antibiotic, 0.4 pound of 250,000 international units of vitamin A per gram, approximately 0.05 pound of trace minerals, 1.26 pounds of pyrophosphate as a sequestering agent and 27 pounds of water. Mix thoroughly with the product of Step IV.

STEP VI

Combine phosphoric acid and ammonium phosphate at a 1 to 4 molecular ratio, resulting in a mixture having an average composition corresponding to the formula $(NH_4)_{1.6}H_{1.4}PO_4$. Whatever the exact composition, the resultant substance is a mixture of monoammonium phosphate and diammonium phosphate and is referred to herein as ammoniated phosphoric acid. Mix in 135 pounds of this ammoniated phosphoric acid to obtain the final product.

In the event that the ammoniated phosphoric acid is processed in such a manner as to contain sufficient quantities of pyrophosphates to accomplish the desirable sequestering effect provided for in Step IV, then the addition of pyrophosphate in Step IV may be omitted and the amount of ammoniated phosphoric acid in Step V increased accordingly. Also, the phosphoric acid and diammonium phosphate can each be separately mixed with the product of Step V or first combined and then mixed in.

The resulting product contains a sulfur-nitrogen ratio of approximately 1 to 15 by weight, which retards the release of ammonia gas within the animal, reducing toxic reactions. Increasing the nitrogen will increase the toxicity. In this regard, the feed supplement should contain a sulfur-nitrogen ratio of not more than 15 parts of nitrogen to 1 part of sulfur by weight, preferably 10–15 parts of nitrogen to 1 part of sulfur by weight. An especially preferred embodiment comprises a sulfur-nitrogen ratio in the feed supplement of approximately 12 parts of nitrogen to 1 part of sulfur by weight.

The addition of a hormone, such as diethylstilbestrol, as in Step II, is not a necessary ingredient, however, it is highly desirable in any ruminant feed. In order to use diethylstilbestrol or other hormones in such a feed supplement, it may be necessary that it be emulsified, either by the addition of an emulsifier, as exemplified in Step II, or by utilizing diethylstilbestrol previously combined with an emulsifier. This is particularly true in the case of hormones supplied on oil carriers. Hormones provided on, for example, a glycol base may not require the presence of an emulsifier. A desirable and suitable emulsifier will produce a stable oil-in-water emulsion. The simple addition of a hormone to a feed supplement is potentially dangerous to the health of the animal, but I have discovered that emulsifying the hormone and/or controlling the amount of the feed supplement taken by the animal alleviates this danger.

The addition of molasses in Step IV can be omitted, resulting in a pre-mix which can be easily transported and later mixed with any molasses or other liquid carrier desired. Some of the liquid carriers that can be used, in addition to molasses, are liquid whey, hemicellulose extract or even water. Molasses is a preferable carrier because of its feed value. The product above described is designed to be slightly acidic which causes the sucrose in the molasses when combined with water to hydrolyze, forming $C_6H_{12}O_6 + C_6H_{12}O_6$ (D-glucose and D-fructose), two simple sugars which are more easily assimilated by the animal.

Antibiotics are added to the product to prevent disease and may be omitted if the user so desires.

The sequestering agent is preferably a pyrophosphate, although other suitable sequestering agents, such as ethylenediaminetetraacetic acid or sugar acids, can be employed.

Various trace minerals and vitamins are added to provide a balanced diet for the animal. Examples of trace minerals normally required are zinc, iron, cobalt, copper, manganese and magnesium, the amounts of which are varied depending upon feed deficiencies in a given area. The addition of the pyrophosphate contained in or added to the ammoniated phosphoric acid, acting as a sequestering agent with the trace minerals, will hold the trace minerals in solution, thereby making them more readily digestible by the animal. Various vitamins can be added as desired.

The amount of ammoniated phosphoric acid in Step VI can be increased until the pH factor of the product reaches 7.0 or decreased until the pH factor reaches 5.8. Any resulting pH factor outside of these limits will produce a product which loses nitrogen and is offensive to the animal, thereby retarding the desire of the animal to eat. If the pH factor falls below 5.8, corrosion of the equipment employed is accelerated. The preferred product as above set forth produces a pH factor of approximately 6.1, which is not corrosive and results in a highly palatable feed for the animal.

It is important to point out that this product is designed to be fed to animals being fattened in a controlled manner of not more than one pound per animal per day. The pre-mix, which does not include the liquid carrier, will constitute, at a maximum, only 2% of the total animal feed intake or ration. No temperature control during the mixing or handling of the product is necessary at liquid temperatures above freezing The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. In a feed supplement for ruminant animals comprising molasses as a liquid sucrose carrier, 0.245 part of urea per part by weight of said molasses, 0.1 part of a water-soluble sulfate selected from the group consisting of sodium sulfate and ammonium sulfate, per part by weight of said molasses, and 0.135 part of ammoniated phosphoric acid per part by weight of said molasses, the improvement wherein said ammoniated phosphoric acid is obtained by combining phosphoric acid and ammonium phosphate in a 1 to 4 molecular ratio and has an average composition corresponding to the formula $$(NH_4)_{1.6}H_{1.4}PO_4$$

and the pH of the feed supplement is between 5.8 and 7.0, whereby there is provided a feed that is highly palatable to the ruminant.

2. The feed supplement of claim 2 wherein the product of pH is about 6.1.

References Cited

UNITED STATES PATENTS

| | | | |
|---|---|---|---|
| 2,814,556 | 11/1957 | Christoffel | 71—29 |
| 3,325,289 | 6/1967 | Lyons | 99—6 |
| 2,770,538 | 11/1956 | Vierling | 71—29 |
| 2,569,282 | 9/1951 | Block | 99—6 |
| 2,960,406 | 11/1960 | Cardon | 99—2 |
| 2,932,571 | 4/1960 | Tribble | 99—2 |
| 3,420,672 | 1/1969 | Appleman | 99—2 |
| 3,523,798 | 8/1970 | Kail | 99—6 |
| 3,165,413 | 1/1965 | Weber et al. | 99—6 |

NORMAN YUDKOFF, Primary Examiner

C. P. RIBANDO, Assistant Examiner

U.S. Cl. X.R.

99—6; 71—26, 30

UNITED STATES PATENT OFFICE
CERTIFICATE OF CORRECTION

Patent No. 3,733,203　　　　　Dated May 15, 1973

Inventor(s) Donald M. STEEN

It is certified that error appears in the above-identified patent and that said Letters Patent are hereby corrected as shown below:

Column 4,

Claim 2, line 43, "The feed supplement of claim 2"

should read --The feed supplement of claim 1--

Signed and sealed this 20th day of November 1973.

(SEAL)
Attest:

EDWARD M. FLETCHER, JR.　　　　　RENE D. TEGTMEYER
Attesting Officer　　　　　　　　Acting Commissioner of Patents